United States Patent
Blinn et al.

(10) Patent No.: US 8,468,587 B2
(45) Date of Patent: Jun. 18, 2013

(54) BINDING ACTIVATION OF NETWORK-ENABLED DEVICES TO WEB-BASED SERVICES

(75) Inventors: Arnold N. Blinn, Bellevue, WA (US); Don M. Gillett, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 889 days.

(21) Appl. No.: 12/239,677

(22) Filed: Sep. 26, 2008

(65) Prior Publication Data

US 2010/0083363 A1    Apr. 1, 2010

(51) Int. Cl.
*H04L 29/06* (2006.01)
*H04L 9/32* (2006.01)

(52) U.S. Cl.
USPC ............ 726/9; 726/7; 726/28; 713/185

(58) Field of Classification Search
None
See application file for complete search history.

(56) References Cited

U.S. PATENT DOCUMENTS

| | | | |
|---|---|---|---|
| 6,226,642 B1 | 5/2001 | Beranek et al. | |
| 6,243,104 B1 | 6/2001 | Murray | |
| 6,307,641 B1 | 10/2001 | Hamano et al. | |
| 6,377,991 B1 | 4/2002 | Smith et al. | |
| 6,397,246 B1 | 5/2002 | Wolfe | |
| 6,807,577 B1 * | 10/2004 | Gillespie et al. | 709/227 |
| 6,886,013 B1 | 4/2005 | Beranek | |
| 6,886,095 B1 * | 4/2005 | Hind et al. | 713/168 |
| 6,891,953 B1 | 5/2005 | DeMello et al. | |
| 6,978,373 B1 * | 12/2005 | Hild et al. | 713/182 |
| 7,003,495 B1 * | 2/2006 | Burger et al. | 705/50 |
| 7,047,416 B2 | 5/2006 | Wheeler et al. | |
| 7,055,040 B2 | 5/2006 | Klemba et al. | |
| 7,076,495 B2 | 7/2006 | Dutta et al. | |
| 7,096,418 B1 | 8/2006 | Singhal et al. | |
| 7,103,778 B2 * | 9/2006 | Kon et al. | 713/185 |
| 7,111,254 B1 | 9/2006 | Rosen et al. | |
| 7,120,897 B2 | 10/2006 | Ebbo et al. | |
| 7,143,347 B2 | 11/2006 | Su | |
| 7,185,193 B2 * | 2/2007 | Watanabe et al. | 713/155 |
| 7,242,406 B2 | 7/2007 | Robotham et al. | |
| 7,243,238 B2 * | 7/2007 | Watanabe et al. | 713/182 |
| 7,251,780 B2 | 7/2007 | Cheng | |
| 7,263,205 B2 | 8/2007 | Lev | |

(Continued)

OTHER PUBLICATIONS

"VeriSign Unified Authentication", Retrieved at <<http://www.verisign.com/static/016549.pdf>>, Nov. 16, 2005, VeriSign, pp. 1-18.

(Continued)

*Primary Examiner* — Christopher Revak
(74) *Attorney, Agent, or Firm* — The Law Office of Michael E. Kondoudis

(57) ABSTRACT

A method for associating a networked device with an online service is provided. The networked device may be an appliance or other device that has limited input capabilities, making it difficult to to download information such as digital media files from an online service without having to input a significant amount of information using the device or appliance. The method begins by establishing communication with a service over a network. A claim token is received from the service over the network. The claim token is returned to the service over the network after the claim token has been bound to an authorized user of the service. In response to return of the claim token, a device identifier binds the networked device to an account with the service that is associated with the authorized user.

19 Claims, 3 Drawing Sheets

U.S. PATENT DOCUMENTS

| | | | |
|---|---|---|---|
| 7,287,158 B2* | 10/2007 | Futamura et al. | 713/156 |
| 7,297,062 B2 | 11/2007 | Gatto et al. | |
| 7,412,478 B1 | 8/2008 | Caruso et al. | |
| 7,801,942 B2 | 9/2010 | Caruso et al. | |
| 7,809,609 B2 | 10/2010 | Hikida | |
| 7,853,593 B2 | 12/2010 | Serdy, Jr. et al. | |
| 2001/0014878 A1* | 8/2001 | Mitra et al. | 705/39 |
| 2002/0026574 A1* | 2/2002 | Watanabe et al. | 713/155 |
| 2002/0026577 A1* | 2/2002 | Futamura et al. | 713/156 |
| 2002/0026581 A1* | 2/2002 | Matsuyama et al. | 713/168 |
| 2002/0046336 A1* | 4/2002 | Kon et al. | 713/156 |
| 2002/0062396 A1 | 5/2002 | Kakei et al. | |
| 2002/0161794 A1 | 10/2002 | Dutta et al. | |
| 2003/0009542 A1 | 1/2003 | Kasal et al. | |
| 2003/0025728 A1 | 2/2003 | Ebbo et al. | |
| 2004/0098313 A1* | 5/2004 | Agrawal et al. | 705/26 |
| 2004/0181667 A1* | 9/2004 | Venters et al. | 713/164 |
| 2004/0205650 A1 | 10/2004 | Cheng | |
| 2004/0249768 A1* | 12/2004 | Kontio et al. | 705/65 |
| 2005/0038874 A1 | 2/2005 | Ramaswamy et al. | |
| 2005/0137889 A1 | 6/2005 | Wheeler | |
| 2005/0138410 A1* | 6/2005 | Masuouka et al. | 713/200 |
| 2005/0165617 A1* | 7/2005 | Patterson et al. | 705/1 |
| 2005/0198353 A1 | 9/2005 | Zmrzli | |
| 2005/0203882 A1 | 9/2005 | Godley | |
| 2005/0223084 A1 | 10/2005 | Cheng | |
| 2005/0256923 A1 | 11/2005 | Adachi | |
| 2006/0048212 A1* | 3/2006 | Tsuruoka et al. | 726/4 |
| 2006/0085731 A1 | 4/2006 | Cui et al. | |
| 2006/0248192 A1 | 11/2006 | Morris, III et al. | |
| 2006/0265652 A1 | 11/2006 | Seitz et al. | |
| 2007/0016941 A1 | 1/2007 | Gonzalez et al. | |
| 2007/0024909 A1 | 2/2007 | Hanechak | |
| 2007/0044146 A1* | 2/2007 | Murase et al. | 726/10 |
| 2007/0162961 A1* | 7/2007 | Tarrance et al. | 726/5 |
| 2007/0240076 A1 | 10/2007 | Astala et al. | |
| 2007/0250510 A1 | 10/2007 | Nachman | |
| 2007/0277114 A1 | 11/2007 | Mudge et al. | |
| 2007/0291153 A1 | 12/2007 | Araki et al. | |
| 2008/0015987 A1* | 1/2008 | Ramavarjula et al. | 705/44 |
| 2008/0020738 A1* | 1/2008 | Ho et al. | 455/414.1 |
| 2008/0028085 A1 | 1/2008 | Venkatavaradan et al. | |
| 2008/0041936 A1* | 2/2008 | Vawter | 235/380 |
| 2008/0052772 A1* | 2/2008 | Conrado et al. | 726/10 |
| 2008/0072303 A1* | 3/2008 | Syed | 726/10 |
| 2008/0123843 A1 | 5/2008 | Machani | |
| 2008/0143890 A1 | 6/2008 | Rosencwaig et al. | |
| 2008/0152146 A1* | 6/2008 | Conrado et al. | 380/278 |
| 2008/0155675 A1* | 6/2008 | Tu et al. | 726/9 |
| 2008/0168139 A1* | 7/2008 | Junuzovic et al. | 709/205 |
| 2008/0189648 A1 | 8/2008 | Anglin et al. | |
| 2008/0189766 A1 | 8/2008 | Bell et al. | |
| 2008/0222273 A1 | 9/2008 | Lakshmanan et al. | |
| 2008/0235594 A1 | 9/2008 | Bhumkar et al. | |
| 2008/0275886 A1 | 11/2008 | Caruso et al. | |
| 2009/0006271 A1 | 1/2009 | Crowder | |
| 2009/0119602 A1 | 5/2009 | Nishiyama | |
| 2009/0132551 A1 | 5/2009 | Allen et al. | |
| 2009/0177761 A1 | 7/2009 | Meyer et al. | |
| 2009/0249194 A1 | 10/2009 | Day | |
| 2010/0192212 A1* | 7/2010 | Raleigh | 726/7 |
| 2012/0208496 A1* | 8/2012 | Raleigh | 455/406 |
| 2012/0209750 A1* | 8/2012 | Raleigh | 705/27.1 |
| 2012/0210391 A1* | 8/2012 | Raleigh | 726/1 |
| 2012/0214441 A1* | 8/2012 | Raleigh | 455/406 |

OTHER PUBLICATIONS

Bustamante, Michele Leroux, "Secure your ASP.NET Apps and WCF Services with Windows CardSpace", Retrieved at <<http://msdn.microsoft.com/en-us/magazine/cc163434.aspx>> Aug. 5, 2008, pp. 11.

Hockings, Christopher, "Two-Factor Authentication using Tivoli Access Manager WebSEAL", Retrieved at <<http://www.ibm.com/developerworks/tivoli/library/t-webseal/>>, May 1, 2003, pp. 8.

"Great Reasons to Web Enable a Device", <<http://www.blunkmicro.com/webreasons.htm>> (2 pages).

"Wireless Portals and Wireless Service Providers", <<http://www.insight-corp.com/reports/portals.asp>> (5 pages).

* cited by examiner

US 8,468,587 B2

BINDING ACTIVATION OF NETWORK-ENABLED DEVICES TO WEB-BASED SERVICES

BACKGROUND OF THE INVENTION

As the Internet continues to grow and become more pervasive in homes, more and more consumer products are expected to be connected to the Internet and interconnected with one another over local area networks (LANs). For example, an Internet-equipped refrigerator can maintain an inventory of groceries and re-order when necessary. An Internet-equipped alarm clock can communicate with a source of current weather and road conditions and determine the correct time to wake up someone. Likewise, a digital picture frame is a processor-based device that may be used like a conventional picture frame to display pictures, such as pictures of family and friends and the like. However, with a digital picture frame, the pictures may be changed and displayed digitally. Some digital picture frames have network connectivity capabilities so that they can periodically download pictures over a modem or broadband connection from the Internet into a local memory for display. Networked devices such as refrigerators, clocks, digital picture frames and the like are examples of networked appliances, which may be defined as dedicated function consumer devices containing a networked processor. That is, a networked appliance is a less fully featured processor-based device that has a network connection.

One problem with a networked appliance as well as many other types of networked devices is that they often have limited user input capabilities. This presents a problem if the networked device needs to receive or otherwise become associated with data over the Internet. For example, a screen-based appliance such as a digital picture frame may only have a user interface that comprises a few buttons on its screen, perhaps with a screen based keyboard to enter more complex data. Such keyboards are cumbersome at best, because the user generally must use arrow buttons to navigate to the desired character and hit "enter" to get the data into the picture frame. Overall, the limited user input capabilities of digital picture frames make it difficult to handle, store and transfer digital media files, particularly when attempting to download such files from a server hosting a web based service. For instance, in order to download digital media files, digital media frames often need to be configured to access the appropriate service, which typically requires typing in a URL for the service. Likewise, a networked refrigerator may need to download a shopping list over the Internet. In both these cases it is relatively cumbersome to type the information needed to associate the device with the desired information given the limited input capabilities of such networked devices and appliances.

SUMMARY

A user of a networked device such as a networked appliance having limited input capabilities can use the technology disclosed herein to download information such as digital media files or other service-oriented data from an online service without having to input a significant amount of information using the device or appliance. In some illustrative examples this is accomplished by having the networked device call into the service via a public interface such as a URL. The service provides the device with a claim token. The claim token is presented to the user on a display of the networked device. The user visits a web site associated with the service, registers or signs in as appropriate and types the claim token in the web site, thereby binding the claim token to the end user. The user then goes back to the networked device and selects a "continue" or "next" button, which causes the claim token to be passed back to the service. The service then returns a permanent device identifier to the networked device, which the device can use for subsequent calls into the service.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

DETAILED DESCRIPTION

Figure 1:
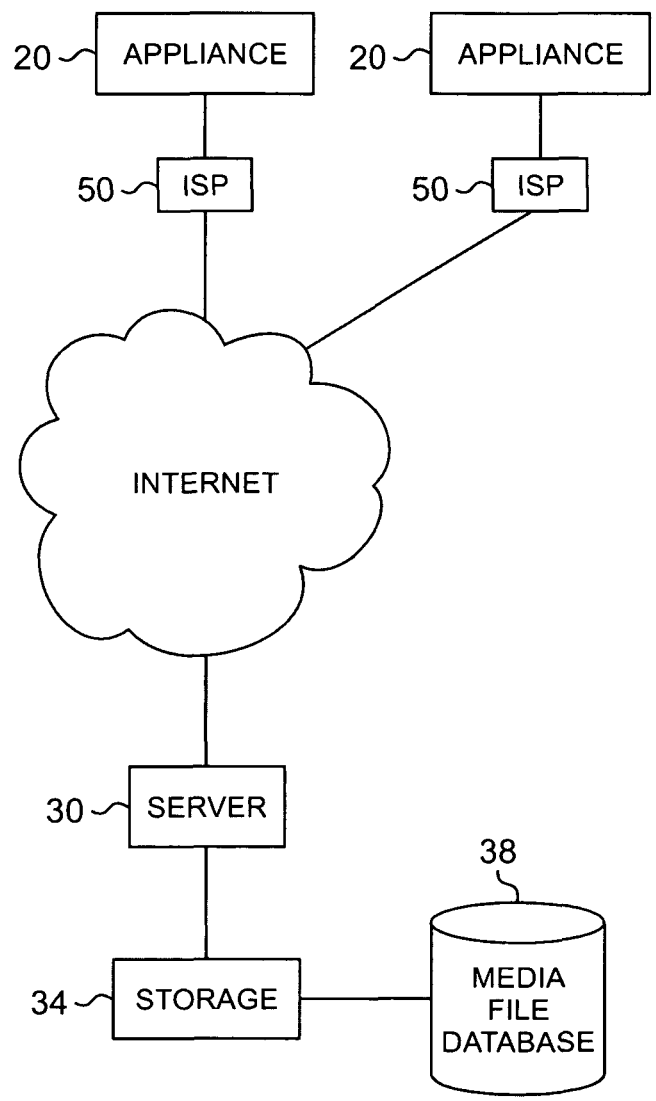
FIG. 1 illustrates an example of an environment in which networked devices such as appliances receive services over the Internet or any other packet-based wide-area network.

FIG. 1 illustrates an example of an environment in which networked devices such as appliances 20 receive services over the Internet 40 or any other packet-based wide-area network. The appliances 20 establish communication to the Internet 40 via one of many available Internet Service Providers (ISPs) 50. Also in communication with the Internet 40 is a server 30 that includes a storage element 34, which has an internal media file database 38 serving as a repository of digital media files. Of course, the server 30 may utilize other back end systems and services as an alternative to the storage element 34 and database 38. In some implementations, server 30 enables image sharing among users of appliances 20, which in these implementations may be digital picture frames. While the Internet 40 is depicted as a cloud, it is understood that this cloud represents that portion of the Internet that does not include the server 30, the appliances' ISP 50, and the appliances 20 themselves. However, it should be noted that from the client's perspective the server 30 or other device or service with which the appliance communicates is often viewed as being inside the cloud. Inside such a cloud are the routers, transmission lines, connections, and other devices that transmit data between the appliances and other clients and servers.

In some implementations the networked devices depicted in FIG. 1 may be any processor-based appliance that is dedicated to a specific task or function. Alternatively, the networked devices may be more general purpose devices. In either case, the networked devices will typically have limited user-input capabilities. For purposes of illustration, however, the description that follows will often describe the networked appliance as a digital picture frame, which is one example of a static display device. Other examples of static display devices that may employ the techniques described herein include, without limitation, digital cameras, MP3 players, DVD players, telephones, televisions and kitchen appliances.

Figure 2:
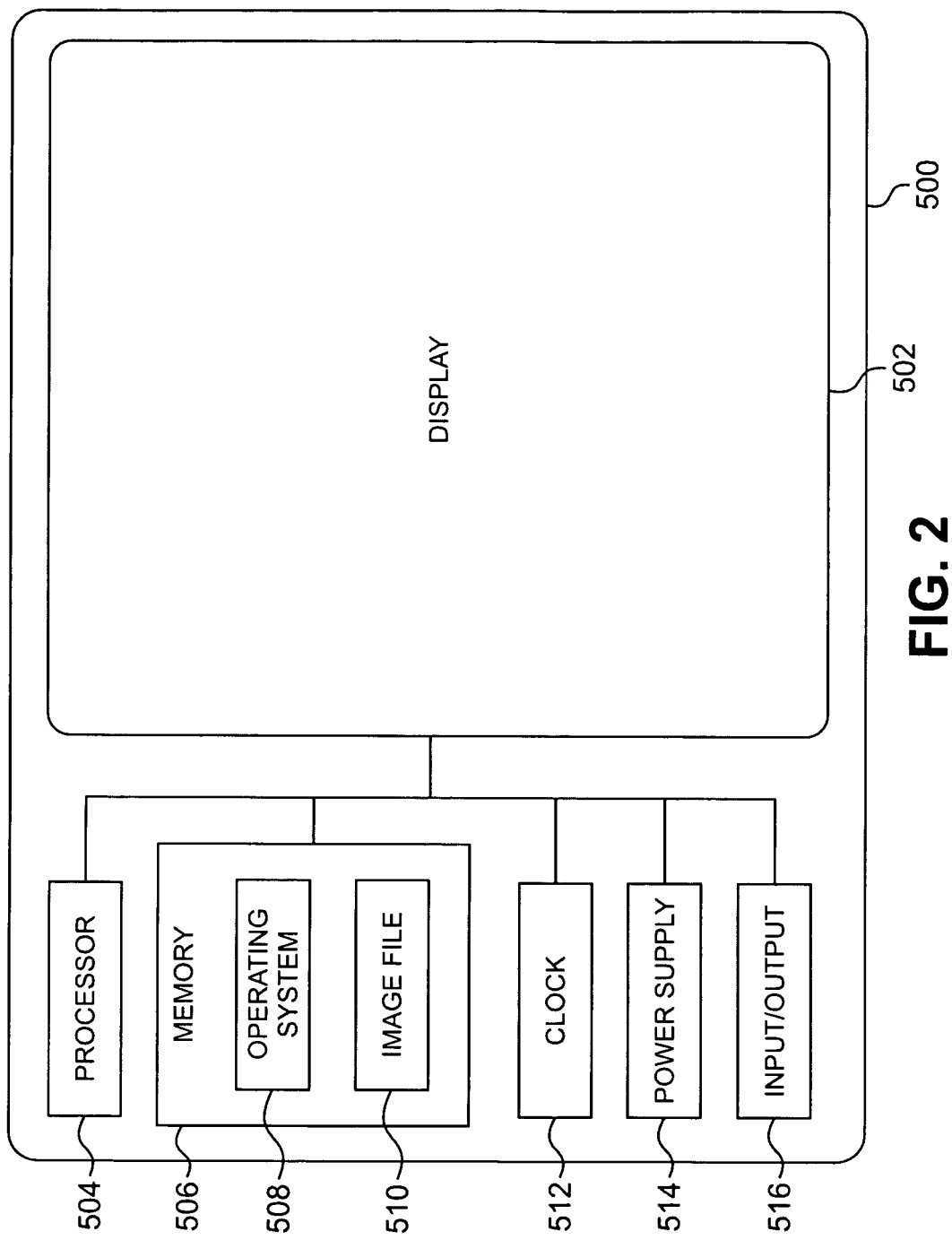
FIG. 2 shows a functional block diagram of an illustrative digital picture frame that is representative of one of the networked devices shown in FIG. 1.

FIG. 2 shows a functional block diagram of an illustrative digital picture frame that will be representative of a networked device. As shown, the digital picture frame 500 is primarily composed of a display 502, e.g., an LCD. The display 502 may be connected by a system bus to a processor 504 and a memory 506. The processor 504 may have limited capabilities to reduce the cost of the frame. The memory 506 may store a limited operating system to provide the retrieval and display of images from a network source. The memory 506 may also store one or more image files 510 for presentation on the display 502. The memory 506 may further store RSS files indicating locations and schedules for retrieval of new image files of dynamic content. The digital picture frame 500 may further include a clock 512 in order to implement the retrieval of images in accordance with a schedule that may be provided in an RSS file. The clock 512 may be a separate component or it may be included as part of the architecture of the processor 504. The digital picture frame 500 may further include a power supply 514 which may be in the form of batteries or an ac/dc converter for plugging into a wall outlet. Additionally, the digital picture frame 500 may include an input/output 516 for receipt of image files and RSS files from and for transmission of URLs, claim tokens and the like to the image service. The input/output 516 may be a wired or wireless connection point.

In use, a user may employ a web-based image service to access digital media files that he or she wishes to download to the digital picture frame. The media files that the user wishes to download may be images that other users have uploaded to share with the user, images that the user him- or herself has uploaded, imaged obtained from photo-sharing or social networking sites such as Facebook, Flicker, Windows Live and the like as well as from other online sources. In any case, the user will typically need to establish an account with the image service by accessing, for instance, a server (e.g., server 30 shown in FIG. 1) associated with the service. Once the account has been established, the user may optionally thereafter need to log-in to the server in order to download or otherwise access the image data to the digital picture frame. As previously mentioned, this can be difficult to perform directly from the networked appliance, which may have limited input capabilities.

Figure 3:
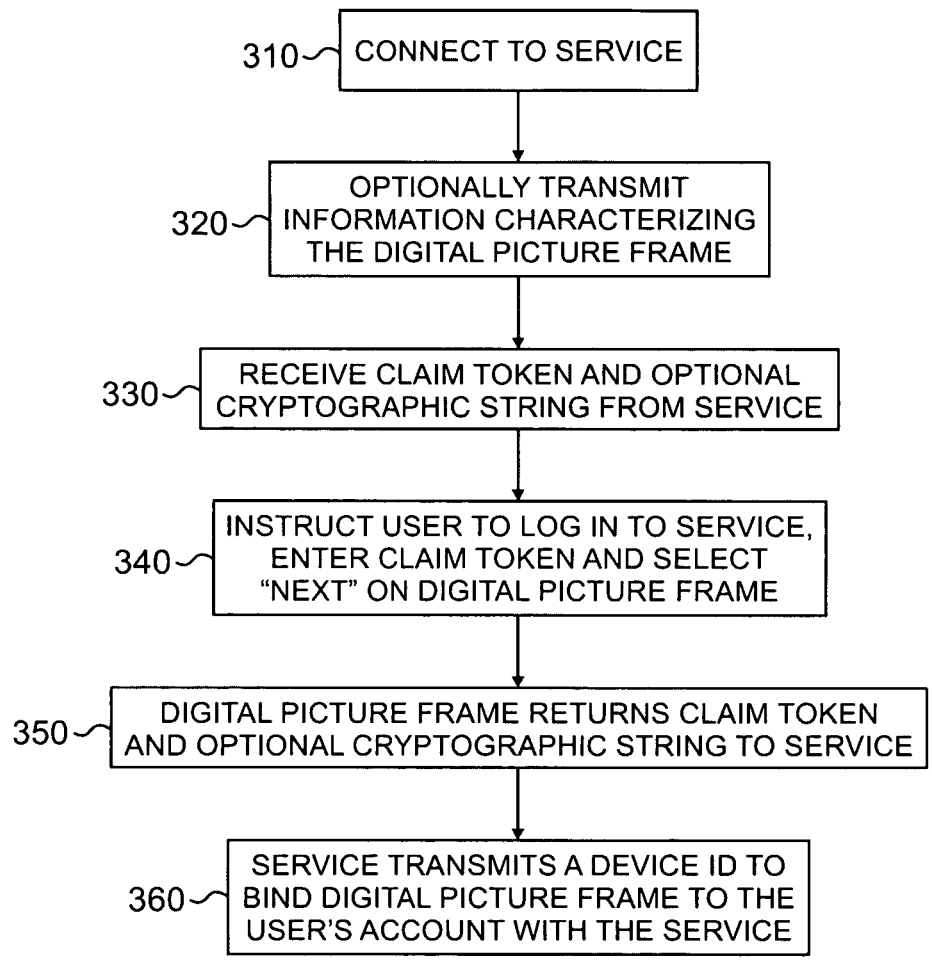
FIG. 3 is a flowchart illustrating one example of a method for associating a networked device with an online service.

To overcome this problem, the digital picture frame performs a two factor binding to the service through a common identifier. In particular, an authorized user can bind the device to the service using a separate networked device that has a more capable user interface than is available on the networked device onto which the media files or other information are to be downloaded. One example of the process used to perform this task will now be presented in connection with the flow-chart shown in FIG. 3.

First, in step 310, the digital picture frame connects to the service when it boots up or is otherwise initialized, or when the user presses a physical, screen-based or virtual button associated with its user interface. This can be achieved by contacting the image service with a location identifier, for example, a public URL that points to the image service. In some cases the digital picture frame optionally may send in step 320 the image service selected information characterizing the digital picture frame such as its manufacturer, model number, serial number and the like. This information may be encoded in a format referred to herein as a manufacturer ID. The image service may use the manufacturer ID to customize the image files sent to the digital picture frame based on a variety of characteristics of the frame such as its size, resolution, orientation, supported formats and so on.

Once the image service has been contacted by the digital picture frame, the service in step 330 returns a claim token that is presented on the display or user interface portion of the frame. Optionally, a cryptographic string also may received from the service. The claim token may be an arbitrary alphanumeric string generated by the service. The user is instructed to visit the service in step 340 and enter the token, after which the user is to select "next" on the user interface of the frame. For this purpose a URL or other location identifier to the service may be provided. The user may employ a computer such as a personal computer, a notebook computer or a handheld device in order to communicate with the image service by typing in the URL. The user logs in to the service, enters the claim token, returns to the frame, and selects "next" on its user interface. This process binds the claim token to the user.

The length of the claim token's character string will generally depend on the length of time over which the token remains valid. In particular, a shorter code will be valid for a shorter length of time, whereas a longer string will be valid for a longer length of time. For instance, a shorter claim token will typically need to be claimed within a few hours from the time it is generated. Of course, a shorter character string will be more convenient for the user. However, it should be sufficiently long so that it is difficult for a hacker to guess. Of course, even if a hacker were to correctly guess the character string, it would not be a particularly serious problem because the user simply would be requested to start the process over. Once a claim token has expired it may be reused by the service.

In step 350, the digital picture frame makes a second call to the service after the user enters "next" through its user interface. During this call the frame passes back the claim token (and the cryptographic string, if employed) to the server. It may also send the manufacturer ID that was sent to the service during the first call, thereby allowing the service to verify that this is the same frame that made the initial request. In response to this second call the image service returns a device ID to the frame in step 360. The device ID will be used by the frame when it needs to make subsequent calls to the service in order to request (using e.g., an http query) and download digital media files. That is, the device ID binds the digital picture frame to the user's account with the service.

In some implementations the request for digital media files may cause service to return media files and/or additional URLs or other location identifiers in an RSS feed. The RSS feed may describe a list of images available from the image service for download and rendering on the digital picture frame. These individual images may comprise a wide variety of images available from photo share sites, dynamic content transformed by the image service, and images directly generated by the image service. Images generated by the image service may be high fidelity images constructed using raw information content, e.g., weather or news, rendered by the image service specifically for the digital picture frame rather than an image representation of a web page.

One important advantage of the technique for retrieving digital media files described above is that the user never needs to enter any data using the digital picture frame. Rather, the user logs in and enters the claim token using a computer or other device that has a more full-featured user interface such as a keyboard.

In the event that the claim token passed back to the service by the frame is invalid or has timed-out, the user will be presented with an error code and asked to restart the process on the frame. If the frame is given to another user, that user can reactivate the service by contacting the service to receive a new claim token.

In the event that a hacker enters a claim token into the image service's web site before the legitimate user does so, the legitimate user will receive an error when he or she attempts to enter the claim token and will be asked to start the process over. If the user were to ignore the error message and select "enter" on the frame, the user would simply receive digital media files intended for the hacker, which is not a high breach of security since the legitimate user is viewing the hackers' media files; the hacker is not able to view the legitimate user's media files. Accordingly, the legitimate user's privacy is protected.

To enhance security to reduce the likelihood of access by a hacker or other unauthorized user, in some implementations a cryptographic string may be sent to the digital picture frame along with the claim token. The cryptographic string would not be visible to the user. When the user selects "next" on the frame to return the claim token (after logging in to the service and entering the token via a computer) the cryptographic string is passed back to the service, thus further verifying that the frame returning the token is indeed the same frame that made the initial request.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products. In one implementation, a computer program product is provided as a computer-readable medium storing an encoded computer program executable by a computer system. Another implementation of a computer program product may be provided in a computer data signal embodied in a carrier wave by a computing system and encoding the computer program. Other implementations are also described and recited herein.

The above specification, examples, and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A method for associating a networked device with an online service, comprising:
   establishing communication with a service over a network;
   receiving a claim token from the service over the network;
   returning the claim token to the service over the network after the claim token has been bound to an authorized user of the service; and
   in response to return of the claim token, receiving a device identifier binding the networked device to an account with the service that is associated with the authorized user, wherein the claim token is bound to the authorized user when the user logs-in to the service and returns the claim token to the service using a second networked device having a more capable user interface than that associated with the networked device.

2. The method of claim 1 wherein the networked device is a networked appliance.

3. The method of claim 2 wherein the networked appliance is a digital picture frame and the service is an image service for downloading digital media files or RSS files to the digital picture frame.

4. The method of claim 1 further comprising establishing communication with the service by receiving a user input on the networked device to activate the networked device.

5. The method of claim 1 further comprising requesting the authorized user to select a specified input on the networked device in order to return the claim token to the service and receiving the specified input.

6. The method of claim 3 further comprising receiving from the image service digital media files associated with the account of the authorized user.

7. The method of claim 1 further comprising transmitting information identifying at least one characteristic of the networked device to the service.

8. The method of claim 1 wherein the claim token is valid for only a prescribed period of time after it is provided by the service.

9. The method of claim 1 further comprising:
   receiving, in addition to the claim token, a cryptographic string that is not made visible to the user; and
   returning the cryptographic string to the service along with the claim token.

10. A method for providing access to information available over a network to a networked device authorized to receive the information, comprising:
    receiving a request over the network from the networked device to access a user account associated with an online service;
    in response to the request, transmitting a claim token to the networked device;
    receiving, via a second networked device, the claim token from an authorized user who has logged in to the user account to thereby bind the claim token to the authorized user, the second networked device having a more capable user interface than that associated with the networked device;
    after the authorized user is bound to the claim token, transmitting a device identifier to the networked device to thereby bind the networked device to the user account; and
    receiving the device identifier from the networked device and receiving a query requesting access to the information.

11. The method of claim 10 wherein the information requested by the query is an RSS feed.

12. The method of claim 10 wherein the claim token is a character string that is valid for a prescribed period of time after being transmitted.

13. The method of claim 10 further comprising receiving information identifying at least one characteristic of the networked device.

14. The method of claim 10 further comprising:
transmitting to the networked device, in addition to the claim token, a cryptographic string that is not made visible to the user on the networked device; and
receiving back the cryptographic string from the user device.

15. The method of claim 10 wherein the networked device is a static display device and the online service is an image service for downloading digital media files or RSS files to the static display device.

16. A computer usable storage device not comprising a propagated data signal for storing computer-executable instructions for performing a computer process to associate a networked appliance with an online service, wherein the instructions comprise operations to:
contact a service over a network;
receive a claim token from the service over the network;
return the claim token to the service over the network after the claim token has been bound to an authorized user of the service; and
in response to return of the claim token, receive a device identifier binding the networked appliance to an account with the service that is associated with the authorized user, wherein the claim token is bound to the authorized user when the user logs-in to the service and returns the claim token to the service using a second networked device having a more capable user interface than that associated with the networked device.

17. The device of claim 16 wherein the instructions further comprise operations to request the authorized user to select a specified input on the networked appliance in order to return the claim token to the service.

18. The device of claim 17 wherein the specified input is a screen-based, physical or virtual button.

19. The device of claim 16 wherein the instructions further comprise operations to receive, in addition to the claim token, a cryptographic string that is not made visible to the user; and return the cryptographic string to the service along with the claim token.

* * * * *

UNITED STATES PATENT AND TRADEMARK OFFICE
CERTIFICATE OF CORRECTION

PATENT NO. : 8,468,587 B2
APPLICATION NO. : 12/239677
DATED : June 18, 2013
INVENTOR(S) : Blinn et al.

It is certified that error appears in the above-identified patent and that said Letters Patent is hereby corrected as shown below:

On the Title Page Item (57), under "Abstract" column 2, line 4, after "to" delete second "to".

Signed and Sealed this
Third Day of February, 2015

Michelle K. Lee
*Deputy Director of the United States Patent and Trademark Office*